(12) United States Patent
Cho et al.

(10) Patent No.: US 8,014,026 B2
(45) Date of Patent: Sep. 6, 2011

(54) IMAGE ENCODING AND/OR DECODING SYSTEM, MEDIUM, AND METHOD

(75) Inventors: Dae-sung Cho, Yongin-si (KR); Hyun-mun Kim, Yongin-si (KR); Dae-hee Kim, Yongin-si (KR); Woo-shik Kim, Yongin-si (KR); Dmitri Birinov, Yongin-si (KR); Woong-il Choi, Yongin-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 1201 days.

(21) Appl. No.: 11/647,364

(22) Filed: Dec. 29, 2006

(65) Prior Publication Data

US 2007/0154087 A1   Jul. 5, 2007

Related U.S. Application Data

(60) Provisional application No. 60/754,618, filed on Dec. 30, 2005.

(30) Foreign Application Priority Data

May 30, 2006   (KR) .................. 10-2006-0049031

(51) Int. Cl.
*G06K 9/36* (2006.01)
*H04N 7/12* (2006.01)
(52) U.S. Cl. ......... 358/1.9; 382/166; 382/233; 382/238; 375/240.12; 375/240.13; 375/240.16; 375/240.18; 375/240.24
(58) Field of Classification Search .................. None
See application file for complete search history.

(56) References Cited

U.S. PATENT DOCUMENTS

| | | | |
|---|---|---|---|
| 6,141,379 A | 10/2000 | Sugiyama | |
| 6,359,929 B1 | 3/2002 | Boon | |
| 6,690,728 B1 | 2/2004 | Chang et al. | |
| 2003/0113026 A1* | 6/2003 | Srinivasan et al. | ............ 382/239 |
| 2005/0063465 A1* | 3/2005 | Cote et al. | ................ 375/240.12 |

FOREIGN PATENT DOCUMENTS

EP   1478189   * 11/2004

OTHER PUBLICATIONS

PCT International Search Report issued Apr. 9, 2007 in corresponding Korean Patent Application No. PCT/KR2006/005824.

* cited by examiner

*Primary Examiner* — Benny Tieu
*Assistant Examiner* — Haris Sabah
(74) *Attorney, Agent, or Firm* — Staas & Halsey LLP

(57) ABSTRACT

An image encoding/decoding system, medium, and method. The image encoding system includes a residue production unit arranged to produce first residues corresponding to differences between color components of a current image and color components of a predicted image, a unit arranged to perform spatial transform and quantization with respect to the first residue of a first color component and perform de-quantization and inverse spatial transform with respect to the quantized first residue of the first color component so as to reconstruct the first residue of the first color component, a residue prediction unit arranged to predict second residues with respect to the first residues of the other color components by using the reconstructed first residue of the first color component, and an encoding unit arranged to encode the first residue of the first color component and the second residues of the other color components.

31 Claims, 3 Drawing Sheets

IMAGE ENCODING AND/OR DECODING SYSTEM, MEDIUM, AND METHOD

CROSS-REFERENCE TO RELATED APPLICATIONS

This application claims the priority benefit of U.S. Provisional Application No. 60/754,618, filed on Dec. 30, 2005, in the U.S. Patent and Trademark Office, and Korean Patent Application No. 10-2006-0049031, filed on May 30, 2006, in the Korean Intellectual Property Office, the disclosures of which are incorporated herein in their entirety by reference.

BACKGROUND OF THE INVENTION

1. Field of the Invention

One or more embodiments of the present invention relate to systems, media, and methods of encoding and/or decoding an image, and more particularly, to a system, medium, and method of encoding a 4:4:4 image of H.264/MPEG-4 Advanced Video Coding (AVC) Fidelity Range Extensions (FRExt).

2. Description of the Related Art

H.264/MPEG-4 AVC FRExt includes a 4:4:4 profile. Here, the reference to 4:4:4: represents an equal level of sampling for each of three components, compared to alternative profiles such as a 4:2:0 MPEG profile where one component has a full sampling and the two remaining components are sub-sampled with half the depth in horizontal and vertical directions. Here, this H.264/MPEG-4 AVC FRExt 4:4:4 profile provides an encoding tool effective for dealing with a color space, such as, RGB, as well as a YCbCr 4:4:4 image, supports a high bit depth up to 12 bits per pixel, and enables lossless coding. In a YCbCr color space, Y denotes a luminance component and Cb and Cr denote chrominance components, with most information typically being represented in the Y component, which illustrates the advantage of conventional YCbCr approaches with the above mentioned reduced level of sampling for the Cb and Cr components. Conversely, in an RGB color space, information is evenly distributed in red (R), green (G), and blue (B). Here, YCbCr 4:4:4 similarly represents that the equal level of sampling resolutions of the luminance component and chrominance components of information are identical with each other, like RGB.

In an FRExt standardization, an RGB encoding technique, that is, residual color transform (RCT), has been developed. RCT is used to prevent degradation of image quality from occurring when an RGB color space is transformed into a corresponding YCbCr color space. Such RCT use produces excellent results in RGB encoding with respect to various high quality images and thus has been employed in FRExt. However, RCT needs to be enhanced, in order to increase the efficiency of FRExt 4:4:4 image encoding. Accordingly, embodiments of the present invention such drawbacks for increased efficiency.

SUMMARY OF THE INVENTION

One or more embodiments of the present invention provide an image encoding and/or decoding method, medium, and system in which residual color prediction (RCP), where residues of R and B components among R, G, and B components are predicted from residual color samples of the other G component, is performed to thereby effectively reduce a correlation between the R, G, and B components.

Additional aspects and/or advantages of the invention will be set forth in part in the description which follows and, in part, will be apparent from the description, or may be learned by practice of the invention.

To achieve the above and/or other aspects and advantages, embodiments of the present invention include an image encoding system, including a residue production unit to generate first residues corresponding to differences between color components of a current image and color components of a predicted image, a residue prediction unit to predict second residues with respect to the first residues, the predicted second residues corresponding to color components other than a first color component by using a reconstructed first residue of the first color component reconstructed from a processing of a first residue of the first color component generated by the residue production unit, and an encoding unit to encode the first residue of the first color component and the second residues of the color components other than the first color component.

To achieve the above and/or other aspects and advantages, embodiments of the present invention include an image encoding method, including generating first residues corresponding to differences between color components of a current image and color components of a predicted image, predicting second residues with respect to the first residues, the predicted second residues corresponding to color components other than a first color component by using a reconstructed first residue of the first color component reconstructed from a processing of a first residue of the first color component generated in the generating of the first residues, and encoding the first residue of the first color component and the second residues of the color components other than the first color component.

To achieve the above and/or other aspects and advantages, embodiments of the present invention include at least one medium including computer readable code to control at least one processing element to implement an embodiment of the present invention.

To achieve the above and/or other aspects and advantages, embodiments of the present invention include an image decoding system, including a residue obtaining unit to receive a first residue for a first color component and second residues for color components other than the first color component, with the second residues having been derived from the first residue for the first color component, a residue compensation unit to generate first residues for the color components other than the first color component from the second residues of the color components other than the first color component by using the first residue of the first color component, and a restoring unit to restore a corresponding image by adding the first residue of the first color component and the generated first residues of the color components other than the first color component to corresponding color components of a predicted image.

To achieve the above and/or other aspects and advantages, embodiments of the present invention include an image decoding method including receiving a first residue for a first color component and second residues for color components other than the first color component, with the second residues having been derived from the first residue for the first color component, generating first residues for the color components other than the first color component from the second residues of the color components other than the first color component by using the first residue of the first color component, and restoring a corresponding image by adding the first residue of the first color component and the generated first residues of the color components other than the first color component to corresponding color components of a predicted image.

To achieve the above and/or other aspects and advantages, embodiments of the present invention include an image encoding method including setting a flag that selectively represents execution and non-execution of color prediction for each of a plurality of macroblocks into which a current image is divided, generating first residues corresponding to differences between color components of a current image and color components of a predicted image, de-quantizing and inverse spatial transforming a quantization of a first residue of a first color component to generate a reconstructed first residue when the flag is set to execute color prediction with respect to a corresponding macroblock, predicting second residues with respect to the generated first residues, the predicted second residues corresponding to color components other than the first color component by using the reconstructed first residue of the first color component, and encoding the first residue of the first color component and the second residues of the color components other than the first color component.

To achieve the above and/or other aspects and advantages, embodiments of the present invention include an image decoding method, including receiving and preprocessing a bitstream for a first residue of a first color component and second residues for color components other than the first color component, with the second residues having been derived from the first residue for the first color component, of an image divided into a plurality of macroblocks, determining whether a flag selectively representing execution and non-execution of color prediction on a current macroblock is set within the bitstream, generating first residues for the color components other than the first color component from the second residues of the color components other than the first color component by using the first residue of the first color component when the flag is set to execute the color prediction on the current macroblock, and restoring the image by adding the first residue of the first color component and the generated first residues of the color components other than the first color component to corresponding color components of a predicted image.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE PREFERRED EMBODIMENTS

Figure 1:
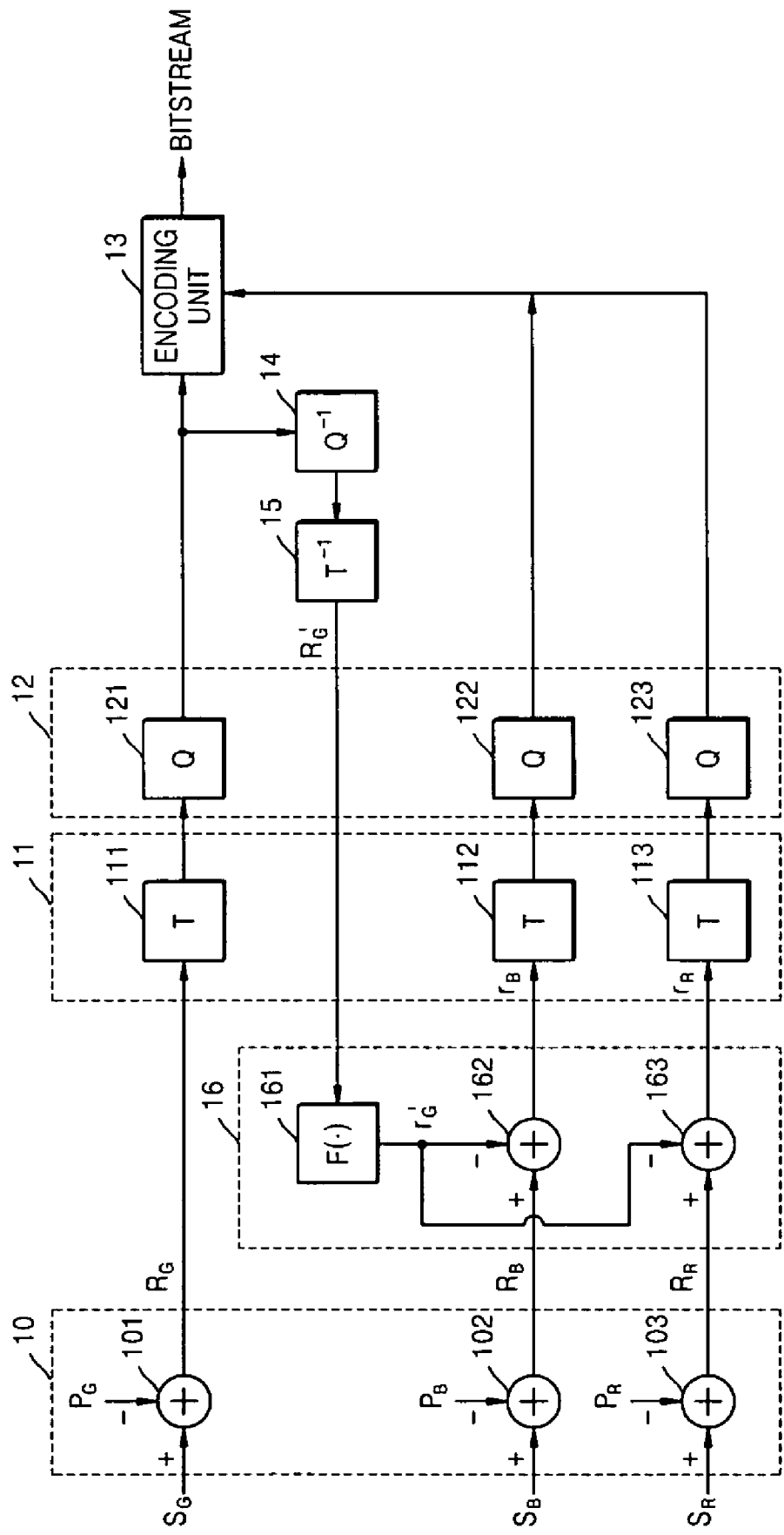
FIG. 1 illustrates an image encoding system, according to an embodiment of the present invention.

Reference will now be made in detail to the embodiments of the present invention, examples of which are illustrated in the accompanying drawings, wherein like reference numerals refer to the like elements throughout. The embodiments are described below to explain the present invention by referring to the figures.

FIG. 1 illustrates an image encoding system, according to an embodiment of the present invention. Referring to FIG. 1, the image encoding system may include a residue production unit 10, a spatial transform unit 11, a quantization unit 12, an encoding unit 13, a de-quantization unit 14, an inverse spatial transform unit 15, and a residue prediction unit 16, for example.

The residue production unit 10 may include a plurality of subtractors 101, 102, and 103, which subtract samples PG, PB, and PR of R, G, and B components inter-predicted or intra-predicted according to a predetermined prediction mode, from samples SG, SB, and SR, respectively, of the R, G, and B components of an input image block, thereby generating first residual samples RG, RB, and RR. The input image block may have a size, such as, 16×16, 16×8, 8×16, 8×8, 8×4, 4×8, or 4×4 pixels. Here, the samples PG, PB, and PR may be obtained using a conventional existing intra/inter-prediction method. Intra-prediction is a form of motion prediction producing a prediction signal with respect to a current block based on neighboring pixels of a current block, namely, pixels highly spatially related to the current block. Inter-prediction is a form of motion prediction producing a prediction signal with respect to a current block based on a reference image temporally adjacent to a current image.

The spatial transform unit 11 transforms the spatial domains of the first residual samples RG, RB, and RR, in the spatial domain, into the frequency domain using discrete cosine transforms (DCT) units 111, 112, and 113, respectively, and the quantization unit 12 quantizes the DCT'd data using quantizers 121, 122, and 123, respectively. The encoding unit 13 then performs entropy encoding with respect to the quantized data. Examples of entropy encoding include context-adaptive variable length coding (CAVLC), context-adaptive binary arithmetic coding (CABAC), etc., for example.

The de-quantization unit 14 may dequantize the quantized data RG of the G component, for example, and the inverse spatial transform unit 15 may then transform the dequantized data RG back into the spatial domain to thereby reconstruct a residual sample RG'. Dequantization and inverse transformation may only be conducted on the residual sample RG, as the G component typically includes of the most image information.

The residue prediction unit 16 may perform residual color prediction (RCP) to predict second residues of the first residual samples RB and RR from the residual sample RG'. The residue prediction unit 16 thus may include a weighted averaging operation unit 161 and subtractors 162 and 163, for example. The weighted averaging operation unit 161 uses values RG' of residual pixels neighboring a given residual pixel so as to obtain second residual data rG' from the residual sample RG' of the given residual pixel.

Figure 2:
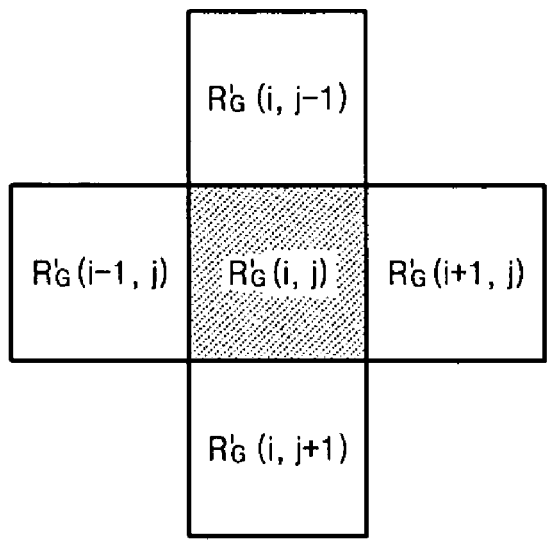
FIG. 2 illustrates a given residual pixel and 4 neighboring residual pixels, the four neighboring residual pixels being used for prediction, according to an embodiment of the present invention.

FIG. 2 illustrates a given residual pixel and 4 neighboring residual pixels, with the four neighboring residual pixels being used for such a weighted averaging operation, for example. In FIG. 2, the shaded pixel is the given residual pixel. The 4 neighboring residual pixels are pixels closest to the given residual pixel from among residual pixels neighboring the given residual pixel. Here, as only an example, pixels above, below, right, and left of the given residual pixel may be selected as such 4 neighboring residual pixels, noting that embodiments of the present invention are not limited to this example, as alternate embodiments are equally available.

A function F(•) used in the weighted averaging operation with respect to the spatially neighboring residual pixels and the reconstructed residual pixel sample RG'(i,j) of the given residual pixel may be defined according to the below Equation 1, for example.

$$R_{G,S}' = 4R_G'(i,j) + R_G'(i+1,j) + R_G'(i,j+1) R_G'(i-1,j) + R_G'(i, j-1)$$

$$r_G'(i,j) = F(R_G') = \text{sign}(R_{G,S}') \cdot [(abs(R_{G,S}') + 4) >> 3] \quad \text{Equation 1}$$

Here, abs(x) denotes a function taking the absolute value of x, >> denotes a right-shift operator, and sign (x) denotes a function expressed according to the below Equation 2, for example.

Equation 2:

$$\text{sign}(x) = \begin{cases} 1, & x \geq 0 \\ -1, & x < 0 \end{cases}$$

According to Equation 1, an RG,S' may be obtained by applying a weighting of 4 to the reconstructed residual pixel sample RG'(i,j), and applying a weighting of 1 to samples of spatially neighboring residual pixels, and summing the weighted values. The predicted second residual pixel rG' may further be obtained by 3-bit right shifting the obtained value RG,S', namely, by averaging the value RG,S', e.g., by dividing by 8.

Although in this example the weighting of 4 was applied to the given residual pixel and a weighting of 1 was applied to the 4 neighboring residual pixels in Equation 1, such weighting factors may vary, e.g., depending on how many neighboring pixels are selected.

When the given residual pixel is located at an edge of a block, the sample values of spatially neighboring pixels outside the block among the spatially neighboring pixels for the given residual pixel may be calculated by mirroring the sample value of the given residual pixel.

Figure 3:
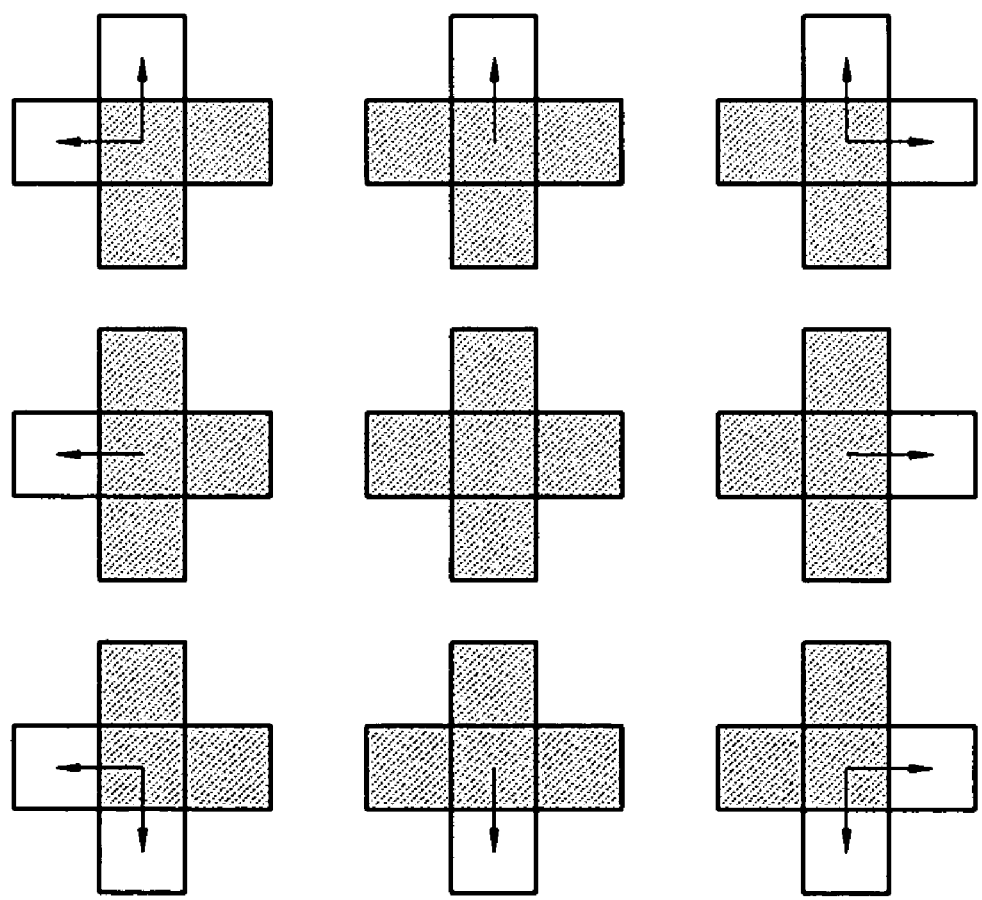
FIG. 3 illustrates mirroring of sample values of a pixel, according to an embodiment of the present invention.

FIG. 3 illustrates such a mirroring of the sample value of the given residual pixel. In FIG. 3, shaded pixels denote pixels inside the given residual block, and white pixels denote pixels outside the given residual block, namely, pixels included in a block other than the given residual block. As illustrated in FIG. 3, the sample values of the white residual pixels may be obtained from the sample values of the horizontally or vertically nearest shaded pixels, as indicated by the arrows of FIG. 3, noting that alternative embodiments are available.

As one alternative, if a block in which the white pixels are included has already been encoded, the sample values of the white pixels themselves can be used instead of the mirroring illustrated in FIG. 3.

The size of a residual block may vary depending on a selected prediction coding mode. For example, the size of the residual block may be 4×4 when the prediction coding mode is an intra-prediction 4×4 mode, and 8×8 when the prediction coding mode is an intra-prediction 8×8 mode or an 8×8 transform may be used in an inter-prediction mode. The size of the residual block may be 16×16 when the prediction coding mode is an intra-prediction 16×16 mode. When 4×4 transform is used in such an intra-prediction 16×16 mode, the size of the residual block may be 4×4 instead of 16×16.

Referring back to FIG. 1, the second residual data rB and rR may be obtained by subtracting the second residual data rG' output by the weighted averaging operation unit 161 from the first residual samples RB and RR, respectively, using the subtractors 162 and 163, respectively, for example.

Figure 4:
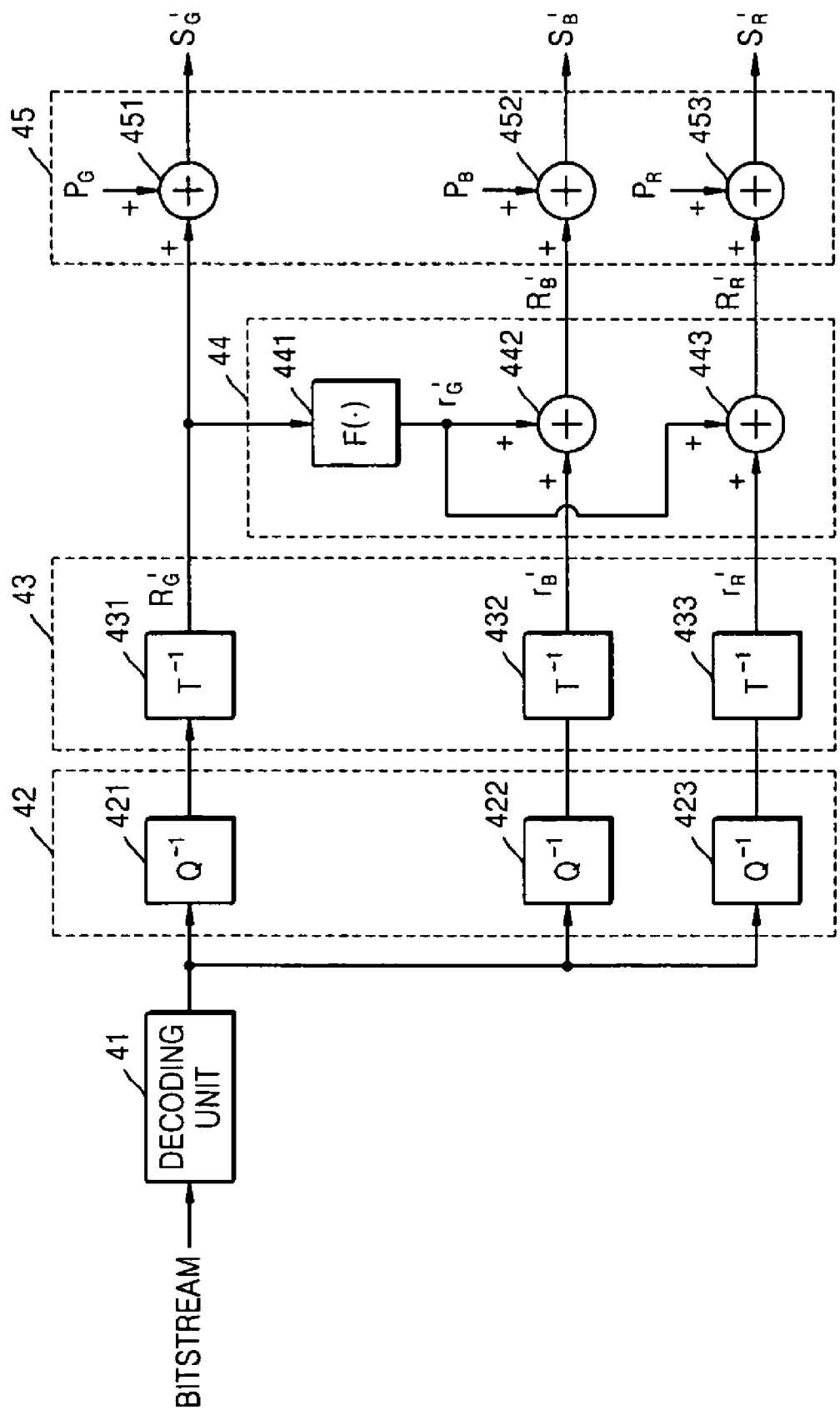
FIG. 4 illustrates an image decoding system, according to an embodiment of the present invention.

FIG. 4 further illustrates an image decoding system, according to an embodiment of the present invention. Referring to FIG. 4, the image decoding system may include a decoding unit 41, a de-quantization unit 42, an inverse spatial transform unit 43, a residue compensation unit 44, and a color information restoring unit 45, for example.

The decoding unit 41 may perform entropy decoding with respect to an input bitstream, with the de-quantization unit 42 dequantizing the decoded data for respective color components using dequantizers 421, 422, and 423, for example. The inverse spatial transform unit 43 may further transform frequency domain data into the spatial domain using inverse spatial transformers 431, 432, and 433, thereby restoring residual data RG', rB', and rR' for the R, G, and B components, respectively. Here, the RG' corresponds to a first residue while rB' and rR' correspond to second residues.

Accordingly, the residue compensation unit 44 may include a weighted averaging operation unit 441 and adders 442 and 443. The weighted averaging operation unit 441 may obtain the second residual data rG' from the first residual sample RG' of the G component, according to the aforementioned application of Equation 1, and the residual samples of the neighboring pixels included in such a weighted averaging operation may be obtained again as illustrated in FIGS. 2 and 3.

In an embodiment, the adders 442 and 443 reconstruct first residual samples RB' and RR' by adding the restored second residual data rB' and rR' of the B and R components to the second residual data rG', respectively. The color information restoring unit 45 further adds the reconstructed first residual samples RG', RB', and RR' to intra/inter-predicted samples PG, PB, and PR of G, B, and R components using adders 451, 452, and 453, respectively, thereby producing R, G, and B component samples SG', SB', and SR'.

The performance of the above-described RCP or RCT is dependent upon the image characteristics or encoding conditions. For example, RCT is efficient for Viper sequences with thermal noise in all color components, while for film sequences in which color components irrelevant to film grain noise is heavily included, RCT does not show greater performance than RCP. Hence, it may be preferable to determine whether to apply RCP to RGB encoding according to given image characteristics. In one embodiment, whether to apply the RCP to RGB encoding may be determined for each macroblock in order to increase the encoding efficiency. In other words, when a picture includes regions where the RCP doesn't represent good coding efficiency, depending on the characteristic of an image sequence, the prediction of B and R components from a G component may selectively not be performed. Accordingly, to control the application of the RCP to each macroblock, a macroblock layer may include a one-bit residual color prediction flag, e.g., residual_colour_prediction_flag, for each macroblock as shown in the below Table 1 to indicate whether the RCP is to be performed with respect to a corresponding macroblock.

TABLE 1

| residual_colour_prediction_flag | Meaning |
| --- | --- |
| 0 | Enable of RCP |
| 1 | Disable of RCP |

In an embodiment, such a residual color prediction flag may be inserted into "Sequence parameter set RBSP (Raw Byte Stream Payload) syntax" defined in H.264/MPEG-4 AVC, as shown in the below Table 2.

Table 2

In Table 2, the bolded portion denotes the portion the residual color prediction flag,

```
seq_parameter_set_rbsp( ) {
    profile_idc
    constraint_set0_flag
    constraint_set1_flag
    constraint_set2_flag
    constraint_set3_flag
    reserved_zero_4bits /* equal to 0 */
    level_idc
    seq_parameter_set_id
    if( profile_idc = =100 | | profile_idc = = 110 | |
        profile_idc = = 122 | | profile_idc = = 166 | | profile_idc = = 188) {
        chroma_format_idc
    if (chroma_format_idc = = 3)
        residual_colour_prediction_present_flag
            bit_depth_luma_minus8
```

"chroma_format_idc" as prescribed in AVC and defines chroma sampling with respect to color luma sampling. When the value of "chroma_format_idc" is 3, for example, it represents a 4:4:4 profile.

The residual color prediction flag may be inserted into a macroblock layer syntax, as prescribed in H.264/MPEG-4 AVC, which is the lowest layer in an encoding layer, as shown in the below Table 3.

TABLE 3

```
macroblock_layer( ) {
    mb_type
    if( mb_type = = I_PCM ) {
        while( !byte_aligned( ))
            pcm_alignment_zero_bit
        for( i = 0; i < 256; i+30+ )
            pcm_sample_chroma[  i  ]
        for( i = 0; i < 2 * MbWidthC * MbHeightC; i+30+ )
            pcm_sample_chroma[  i  ]
    } else {
        noSubMbPartSizeLessThan8x8Flag = 1
        if( mb_type != I_NxN &&
            MbPartPredMode(? mb_type,   0   ) !=
Intra_16x16 &&
            NumMbPart( mb_type ) = = 4 ) {
            sub_mb_pred( mb_type )
            for( mbPartIdx = 0; mbPartIdx +21 4;
mbPartIdx++ )
                if( sub_mb_type[ mbPartIdx ] !=
B_Direct_8x8 ) {
        if( NumSubMbPart( sub_mb_type[   mbPartIdx   ]  ) > 1 )
                            noSubMbPartSizeLess-
Than8x8Flag = 0
                } else if( !direct_8x8_inference_flag )
                        noSubMbPartSizeLess-
Than8x8Flag = 0
        } else {
                if( transform_8x8_mode_flag && mb_
type = = I_NxN )
                    transform_size_8x8_flag
                mb_pred( mb_type )
        }
                if( MbPartPredMode( mb_type,   0   ) !=
Intra_16x16 ) {
                    coded_block_pattern
                    if( CodedBlockPatternLuma > 0 &&
                        transform_8x8_mode_flag &&
mb_type != I_NxN
&&
                        noSubMbPartSizeLessThan8x8Flag &&
                        ( mb_type != B_Direct_16x16 | |
direct_8x8_inference_flag ) )
                    transform_size_8x8_flag
                }
                if( CodedBlockPatternLuma > 0 | | CodedBlockPattern-
```

TABLE 3-continued

```
Chroma > 0 | |
                MbPartPredMode( mb_type,   0   ) = =
Intra_16x16 ) {
            if(residual_colour_prediction_present_flag)
                residual_colour_prediction_flag
            mb_qp_delta
            residual( )
        }
    }
}
```

In the embodiment of Table 3, the bolded portion denotes a portion of the residual color prediction flag. In other words, here, when CodedBlockPatternLuma, representing whether a non-zero AC conversion coefficient of a luma component exists, is greater than 0, CodBlockPatternChroma, representing whether a non-zero AC conversion coefficient of a chroma component exists, is greater than 0, and a prediction mode of a macroblock is an intra-prediction 16×16 mode, the residual color prediction flag is set.

As shown in Table 3, the residual color prediction flag and the above-described residual data may be included in the header of a macroblock. When the value of the residual color prediction flag is 1, the RCP may be enabled. When the value of the residual color prediction flag is 0, the RCP is disabled. When the residual color prediction flag does not exist, the value of the residual color prediction flag may be deemed as 0.

In image encoding and/or decoding, according to one or more embodiments of the present invention, residues of R and B components in an RGB image may be predicted from residual samples of the G component, for example, so that the performance of encoding using RCT is improved.

Further, a macroblock of an image may be produced by further including a residue color prediction flag in a header to indicate selective execution of RCT or RCP depending on the data characteristics of each macroblock. Thus, encoding performance suitable for differing data characteristics can be achieved.

In addition to the above-described embodiments, embodiments of the present invention can also be implemented by executing computer readable code/instructions in/on a medium, e.g., a computer readable medium. The medium can correspond to any medium/media permitting the storing and/or transmission of the computer readable code.

The computer readable code/instructions can be recorded/transferred in/on a medium in a variety of ways, with examples of the medium including magnetic storage media (e.g., ROM, floppy disks, hard disks, etc.), optical recording media (e.g., CD-ROMs, or DVDs), random access memory media, and storage/transmission media such as carrier waves. Examples of storage/transmission media may include wired or wireless transmission (such as transmission through the Internet). The medium may also be a distributed network, so that the computer readable code/instructions is stored/transferred and executed in a distributed fashion. The computer readable code/instructions may be executed by one or more processors.

Although a few embodiments of the present invention have been shown and described, it would be appreciated by those skilled in the art that changes may be made in these embodiments without departing from the principles and spirit of the invention, the scope of which is defined in the claims and their equivalents.

What is claimed is:

1. An image encoding system comprising:
   a residue production unit to generate first residues corresponding to differences between color components of a current image and color components of a predicted image;
   a residue prediction unit to predict second residues with respect to the first residues, the predicted second residues corresponding to color components other than a first color component by using a reconstructed first residue of the first color component reconstructed from a processing of a first residue of the first color component generated by the residue production unit;
   an encoding unit to encode the first residue of the first color component and the second residues of the color components other than the first color component; and
   an operation unit to predict a second residue of the first color component based on the reconstructed first residue of the first color component for a current pixel and reconstructed first residues of the first color component for one or more other pixels,
   wherein the residue prediction unit applies the predicted second residue of the first color component to the first residues corresponding to the color components other than the first color component.

2. The image encoding system of claim 1, further comprising a de-quantization unit and a inverse spatial transform unit to respectively de-quantize and inverse spatial transform a quantization of the first residue of the first color component to generate the reconstructed first residue.

3. The image encoding system of claim 1, wherein the residue prediction unit comprises:
   the operation unit to perform weighted averaging with respect to the reconstructed first residue of the first color component for the current pixel and reconstructed first residues of the first color component for pixels neighboring the current pixel so as to predict the second residue of the first color component; and
   a plurality of subtractors to subtract the second residue of the first color component from first residues of the color components other than the first color component, as the predicted second residues of the color components other than the first color component.

4. The image encoding system of claim 3, wherein pixels among the neighboring pixels are selected for the weighted averaging and weighting values for the selected neighboring pixels are determined based on respective distances between the neighboring pixels and the current pixel.

5. The image encoding system of claim 3, wherein, when the current and predicted images are divided into a plurality of blocks and first residues for each of the blocks are weighted and averaged, if the current pixel is located at an edge of a block including the current pixel, a reconstructed first residue of the first color component of a pixel that is not included in the block but neighboring the current pixel is obtained by mirroring the reconstructed first residue of the first color component of the current pixel.

6. The image encoding system of claim 3, wherein, when the current and predicted images are divided into a plurality of blocks and first residues for each of the blocks are weighted and averaged, if the current pixel is located at an edge of a block including the current pixel and a block to which a pixel neighboring the current pixel belongs has already been encoded, a previously reconstructed first residue of the first color component of the neighboring pixel is used in the weighting and averaging.

7. The image encoding system of claim 1, wherein the predicted image is selectively one of images intra-predicted and images inter-predicted from the current image.

8. An image encoding method, comprising:
   generating first residues corresponding to differences between color components of a current image and color components of a predicted image;
   predicting second residues with respect to the first residues, the predicted second residues corresponding to color components other than a first color component by using a reconstructed first residue of the first color component reconstructed from a processing of a first residue of the first color component generated in the generating of the first residues;
   encoding the first residue of the first color component and the second residues of the color components other than the first color component; and
   predicting a second residue of the first color component based on the reconstructed first residue of the first color component for a current pixel and reconstructed first residues of the first color component for one or more other pixels,
   wherein, in the predicting of the second residues with respect to the first residues, the predicted second residue of the first color component is applied to the first residues corresponding to the color components other than the first color component.

9. The image encoding method of claim 8, further comprising de-quantizing and inverse spatial transforming a quantization of the first residue of the first color component to generate the reconstructed first residue.

10. The image encoding method of claim 8, wherein the predicting of the second residues comprises:
   performing weighted averaging with respect to the reconstructed first residue of the first color component for the current pixel and reconstructed first residues of the first color component for pixels neighboring the current pixel so as to predict the second residue of the first color component; and
   subtracting the second residue of the first color component from first residues of the color components other than the first color component, as the predicted second residues of the color components other than the first color component.

11. The image encoding method of claim 10, wherein pixels among the neighboring pixels are selected for the weighted averaging and weighting values for the selected neighboring pixels are determined based on respective distances between the neighboring pixels and the current pixel.

12. The image encoding method of claim 10, wherein, when the current and predicted images are divided into a plurality of blocks and first residues for each of the blocks are weighted and averaged, if the current pixel is located at an edge of a block including the current pixel, a reconstructed first residue of the first color component of a pixel that is not included in the block but neighboring the current pixel is obtained by mirroring the reconstructed first residue of the first color component of the current pixel.

13. The image encoding method of claim 10, wherein, when the current and predicted images are divided into a plurality of blocks and first residues for each of the blocks are weighted and averaged, if the current pixel is located at an edge of a block including the current pixel and a block to which a pixel neighboring the current pixel belongs has already been encoded, a previously reconstructed first residue of the first color component of the neighboring pixel is used in the weighting and averaging.

14. At least one medium comprising computer readable code to control at least one processing element to implement the method of claim 8.

15. An image decoding system, comprising:
    a residue obtaining unit to receive a first residue for a first color component and second residues for color components other than the first color component, with the second residues having been derived from the first residue for the first color component;
    a residue compensation unit to generate first residues for the color components other than the first color component from the second residues of the color components other than the first color component by using the first residue of the first color component;
    a restoring unit to restore a corresponding image by adding the first residue of the first color component and the generated first residues of the color components other than the first color component to corresponding color components of a predicted image; and
    an operation unit to obtain a second residue of the first color component based on the first residue of the first color component for a current pixel and the first residues of the first color component for one or more other pixels,
    wherein the residue compensation unit applies the second residue of the first color component to the second residues for color components other than the first color component.

16. The image decoding system of claim 15, wherein the residue obtaining unit preprocess a bitstream for the first residue of the first color component and the second residues of the color components other than the first color component.

17. The image decoding system of claim 15, wherein the residue compensation unit comprises:
    the operation unit to perform weighted averaging with respect to the first residue of the first color component for the current pixel and first residues of the first color component for pixels neighboring the current pixel so as to obtain the second residue of the first color component; and
    a plurality of adders arranged to add the second residue of the first color component and the second residues of the color components other than the first color component, as the first residues of the color components other than the first color component.

18. The image decoding system of claim 17, wherein pixels among the neighboring pixels are selected for the weighted averaging and weighting values for the selected neighboring pixels are determined based on respective distances between the neighboring pixels and the current pixel.

19. The image decoding system of claim 17, wherein, when the image is divided into a plurality of blocks and first residues for each of the blocks are weighted and averaged, if the current pixel is located at an edge of a block including the current pixel, a first residue of the first color component of a pixel that is not included in the block but neighboring the current pixel is obtained by mirroring the first residue of the first color component of the current pixel.

20. The image decoding system of claim 17, wherein, when the current and predicted images are divided into a plurality of blocks and first residues for each of the blocks are weighted and averaged, if the current pixel is located at an edge of a block including the current pixel and a block to which a pixel neighboring the current pixel belongs has already been decoded, a decoded first residue of the first color component of the neighboring pixel is used in the weighting and averaging.

21. An image decoding method comprising:
    receiving a first residue for a first color component and second residues for color components other than the first color component, with the second residues having been derived from the first residue for the first color component;
    generating first residues for the color components other than the first color component from the second residues of the color components other than the first color component by using the first residue of the first color component;
    restoring a corresponding image by adding the first residue of the first color component and the generated first residues of the color components other than the first color component to corresponding color components of a predicted image; and
    obtaining a second residue of the first color component based on the first residue of the first color component for a current pixel and the first residues of the first color component for one or more other pixels,
    wherein the generation of the first residues includes applying the second residue of the first color component to the second residues for color components other than the first color component.

22. The image decoding method of claim 21, further comprising preprocessing a bitstream for the first residue of the first color component and the second residues of the color components other than the first color component.

23. The image decoding method of claim 21, wherein the generation of the first residues comprises:
    performing weighted averaging with respect to the first residue of the first color component for the current pixel and first residues of the first color component for pixels neighboring the current pixel so as to obtain the second residue of the first color component; and
    adding the second residue of the first color component to the second residues of the color components other than the first color component, as the first residues of the color components other than the first color component.

24. The image decoding method of claim 23, wherein pixels among the neighboring pixels are selected for the weighted averaging and weighting values for the selected neighboring pixels are determined based on respective distances between the neighboring pixels and the current pixel.

25. The image decoding method of claim 23, wherein, when the image is divided into a plurality of blocks and first residues for each of the blocks are weighted and averaged, if the current pixel is located at an edge of a block including the current pixel, a first residue of the first color component of a pixel that is not included in the block but neighboring the current pixel is obtained by mirroring the first residue of the first color component of the current pixel.

26. The image decoding method of claim 23, wherein, when the current and predicted images are divided into a plurality of blocks and first residues for each of the blocks are weighted and averaged, if the current pixel is located at an edge of a block including the current pixel and a block to which a pixel neighboring the current pixel belongs has already been decoded, a decoded first residue of the first color component of the neighboring pixel is used in the weighting and averaging.

27. At least one non-transitory medium comprising computer readable code to control at least one processing element to implement the method of claim 21.

28. An image encoding method comprising:
- setting a flag that selectively represents execution and non-execution of color prediction for each of a plurality of macroblocks into which a current image is divided;
- generating first residues corresponding to differences between color components of a current image and color components of a predicted image;
- de-quantizing and inverse spatial transforming a quantization of a first residue of a first color component to generate a reconstructed first residue when the flag is set to execute color prediction with respect to a corresponding macroblock;
- predicting second residues with respect to the generated first residues, the predicted second residues corresponding to color components other than the first color component by using the reconstructed first residue of the first color component;
- encoding the first residue of the first color component and the second residues of the color components other than the first color component; and
- predicting a second residue of the first color component based on the reconstructed first residue of the first color component for a current pixel and reconstructed first residues of the first color component for one or more other pixels,
- wherein, in the predicting of the second residues with respect to the generated first residues, the predicted second residue of the first color component is applied to the first residues corresponding to the color components other than the first color component.

29. At least one non-transitory medium comprising computer readable code to control at least one processing element to implement the method of claim 28.

30. An image decoding method, comprising:
- receiving and preprocessing a bitstream for a first residue of a first color component and second residues for color components other than the first color component, with the second residues having been derived from the first residue for the first color component, of an image divided into a plurality of macroblocks;
- determining whether a flag selectively representing execution and non-execution of color prediction on a current macroblock is set within the bitstream;
- generating first residues for the color components other than the first color component from the second residues of the color components other than the first color component by using the first residue of the first color component when the flag is set to execute the color prediction on the current macroblock;
- restoring the image by adding the first residue of the first color component and the generated first residues of the color components other than the first color component to corresponding color components of a predicted image; and
- obtaining a second residue of the first color component based on the first residue of the first color component for a current pixel and the first residues of the first color component for one or more other pixels,
- wherein the generation of the first residues includes applying the second residue of the first color component to the second residues for color components other than the first color component.

31. At least one non-transitory medium comprising computer readable code to control at least one processing element to implement the method of claim 30.

* * * * *

UNITED STATES PATENT AND TRADEMARK OFFICE
CERTIFICATE OF CORRECTION

| | |
|---|---|
| PATENT NO. | : 8,014,026 B2 |
| APPLICATION NO. | : 11/647364 |
| DATED | : September 6, 2011 |
| INVENTOR(S) | : Dae-sung Cho et al. |

Page 1 of 1

It is certified that error appears in the above-identified patent and that said Letters Patent is hereby corrected as shown below:

Column 14, Line 30, in Claim 31, after "non-transitory" insert --computer readable--.

Signed and Sealed this
Thirty-first Day of January, 2012

David J. Kappos
*Director of the United States Patent and Trademark Office*